Dec. 22, 1964     H. G. SAUL ETAL     3,162,283
DUAL PURPOSE CHUCK
Filed Feb. 28, 1963

INVENTORS
Henry G. Saul
Albin G. Troka
BY
Leonard S. Knox
Atty

United States Patent Office 3,162,283
Patented Dec. 22, 1964

3,162,283
DUAL PURPOSE CHUCK
Henry G. Saul, Western Springs, and Albin G. Troka, Des Plaines, Ill., assignors to Supreme Products Corporation, Chicago, Ill., a corporation of Illinois
Filed Feb. 28, 1963, Ser. No. 261,743
12 Claims. (Cl. 192—34)

This invention relates to a chuck or similarly functioning tool-gripping device, such as a collet, to be secured to a rotatable spindle, e.g. of a drill press or a hand-held drill, capable of use in a dual capacity, viz. in conventional drilling or in driving screws, studs, nuts and other threaded elements.

The device of the invention is characterized by considerable versatility since the fore part may be a conventional key-operated chuck of the well-recognized Jacobs' design; it may be a collet chuck with a spring-biased retractible sleeve for opening and closing the same, or it may be a simple sleeve with a bore designed to take the uniform shank of a variety of sizes and types of drills or drivers, the shank in this case being retained by a screw bearing on a flat face thereof or other correspondingly functioning expedient. In any of these, or similar cases the fore part of the device receives a drill or driver interchangeably.

Where, herein, we refer to a "chuck" we intend to encompass any means capable of holding a cutting or driving tool whether the same is of a type receiving the tools interchangeably or in which the tool is a permanent part of the device. Where we refer to a "drill" it is intended to encompass any element for cutting, grinding, buffing or other operation which is rotated continuously in one direction, either clockwise or counterclockwise and, where we refer to a "driver" it is intended to encompass any implement having a male or female termination to be engaged with a female or male portion of a work piece, e.g. a screw, which, by rotation of the driver clockwise or counterclockwise, drives the work piece into working position and is to be stopped when the piece is driven "home." This last requires that rotation of the piece will terminate, viz. instantaneous interruption of rotation of the driver. Desirably, and especially in production work, the motive power, e.g. the electric motor, is kept running and cessation of rotation of the driver accomplished by de-clutching some suitable clutch means intermediate the driver-holding means and the spindle of the motor. Where, for convenience and clarity of expression, we refer to a work piece it is intended to embrace such things as screws, studs, nuts as well as a work piece such as an explosive rivet which is detonated by heat applied to the head thereof by a rotary tool capable of creating friction to raise the rivet to detonating temperature. In any of these examples, and others of the same class, the desideratum is the application of a torque for a predetermined period of time, generally under the control of the operator, and its rapid termination.

The instant invention relates to improvements in a clutch for the purposes just stated which is characterized by extreme simplicity and therefore low cost, reliability, ease of engagement and disengagement of the clutch members and which is foolproof.

Another object lies in extremely simple means for maintaining the several parts of the clutch in operating relation in order that disassembly, cleaning and oiling are accomplished in minimum time with the use of standard tools.

A further object resides in the provision of simple means for converting the chuck from drilling to driving by manipulation of a single screw which latter is assembled in the device in a manner precluding loss.

Another object is to provide a device of the character referred to which is adaptable to virtually any form of spindle within some reasonable range of sizes with no alteration of any of the remaining parts thereby lending great flexibility in manufacture and stocking of the device.

A further object resides in a clutch having teeth of a form permitting rapid and relatively chatter-free engagement thereof and which may be only partially and yieldably engaged, if desired, at or near the end of the driving period to drive the work piece home with a succession of controlled hammer blows.

Another object is to provide clutch means as aforesaid which, when utilized with a chuck of the Jacobs' type, may be disassembled and re-assembled without the necessity of disturbing any of the working parts of the chuck.

Other objects and advantages of the invention will become apparent from the ensuing description which, taken with the accompanying drawing, discloses a preferred mode in which the principles of the invention may be carried into practice.

Figure 1:
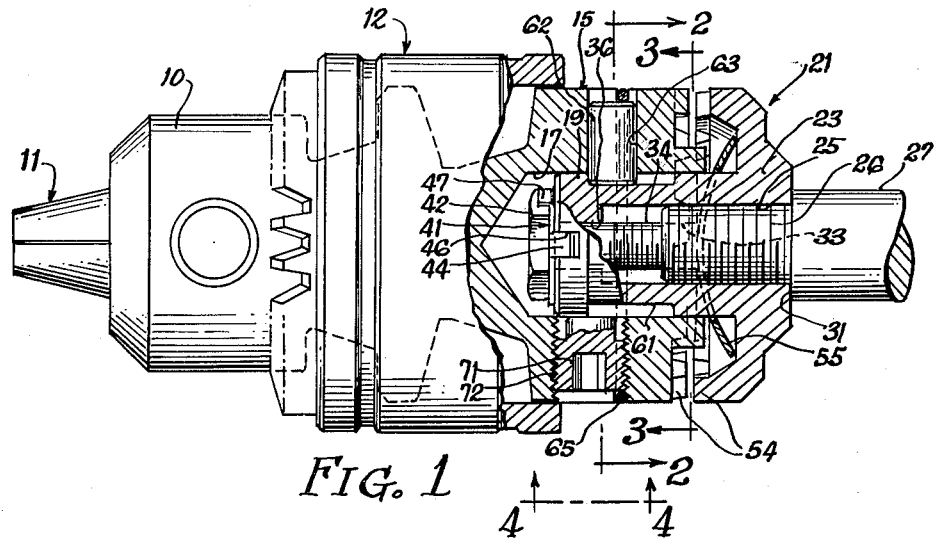
FIG. 1 is a combined elevation and medial cross section of a device incorporating the principles of the invention associated with a Jacobs' type chuck.
Figure 2:
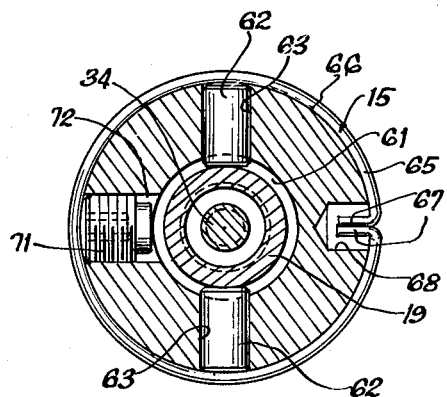
FIG. 2 is a cross section taken essentially on the plane 2—2 of FIG. 1.
Figure 3:
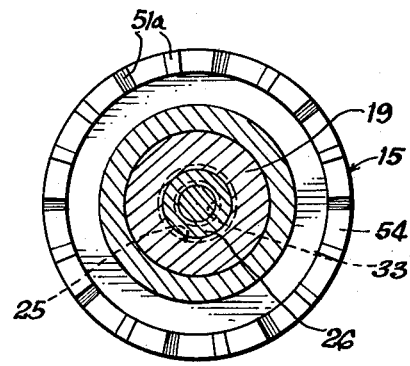
FIG. 3 is a cross section taken on the plane 3—3 of FIG. 1.

Broadly regarded, the invention device comprises some form of tool-holding arrangement terminating rearwardly in an assembly constituting the invention improvement. The tool-holding arrangement may assume any desired form for receiving and gripping a drill or other tool to undergo rotation until interrupted. In this case the invention clutch is engaged. In the majority of cases conventional drilling is performed with an electric motor as the source of power and rotation is interrupted by actuation of a switch. In the case of a hydraulic or pneumatic source of power, a valve is utilized. When the tool is a driver such as a screw- or nut-driver wherein rotation is to be interrupted practically instantaneously with little or no overshoot (coasting) the clutch is rendered selectively engageable under the control of the operator and, by using toothed clutching faces, the driver may have imparted thereto a succession of sharp blows to set the work piece firmly home. At its inboard end the tool holding arrangement is provided with one member of the clutch, referred to herein as the fixed member, i.e. fixed in an axial sense. The other or movable member of the clutch has an integral stem received with a close sliding fit in a bore of the fixed clutch member. The movable member is provided with means to secure the same on the common right-hand threaded end of the spindle of the prime mover and, moreover, to preclude disengagement on counterclockwise rotation, a novel form of lock screw and washer is provided. To retain the fixed and movable clutch members in axial relation but to permit clutching and de-clutching thereof we employ one or more pins slidably received in radial bores in the fixed clutch member. These pins are adapted to enter a circumferential recess in the stem of the movable clutch member, such recess being sufficiently wide in an axial direction to allow the clutch to be engaged and disengaged without affecting cooperation of the pins with the recess. A spring positioned between the fixed and movable clutch members normally biases the clutch to disengaged position. To engage the clutch for some more-or-less extended period of time, as when drilling holes, a dog point, socket-type, headless, set screw is provided in the fixed clutch part and, while the clutch is momentarily held engaged, the screw is tightened against an adjacent portion of the groove in the stem of the movable clutch member to lock the clutch in engaged condition. In order that careless handling will not result in loss of this screw, which is not easily obtainable commercially as a stock item, the screw, in the case of a Jacobs type or similar jaw chuck, is so positioned that the jaw-operating ring or collar overlies the set screw to an extent preventing its withdrawal completely from its tapped hole and yet allow the placement of a socket wrench. In order to retain the radial pin or pins in operative position but still permit facile disassembly of the clutch parts we prefer to utilize a circular hoop of spring wire encircling the fixed clutch part and bearing on the outer ends of these pins. The hoop is interrupted at a point in its circumference and the ends bent inwardly to be received in a bore. Thus, the hoop is easily removed by a hooked implement and is replaced with a snap-action. Additionally, the pins and hoop may be so oriented relative to the locking screw in an axial sense that the hoop may serve as additional or alternative assurance against loss of this screw.

Reverting to the drawings there is shown, by way of example, a device in accordance with the invention wherein the means for gripping the tool, e.g. a twist drill, screwdriver bit or other implement is a chuck of the so-called Jacobs type including a body 10, jaws 11 and jaw-actuating collar 12, this latter being rotatable relative to the body by a key (not shown) but familiar to those skilled in this art.

At its inboard or rear end the body 10 is provided with a generally cylindrical portion 15, referred to herein as the fixed clutch part. At this junction it is to be noted that, when the device is to be used to drive a fastener the fastener-engaging tool, e.g. a screwdriver bit may, at the start, be regarded as axially fixed and the electric drill, for example, moved axially to cause the clutch to engage. Thus, it is convenient to refer to the forward clutch part as "fixed" and the rear clutch part as "movable." The collar 12 overlaps the part 15 to an extent and for a purpose to appear. Insofar as concerns the present invention the collar serves only an incidental function. Its principal function is to operate the jaws 11 and, since such function is well known, detailed treatment will be disregarded.

Figure 5:
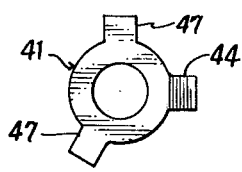
FIG. 5 is a detail in plan of the locking washer for the screw preventing unscrewing of the device from the driving spindle upon left-hand rotation.
Figure 6:
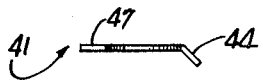
FIG. 6 is a side elevation thereof.

The part 15 is axially bored at 17 to receive, with a sliding fit, a mating generally-cylindrical stem 19 of the movable clutch part 21. This latter may best be referred to as mushroom-shaped including a head 23 and the stem 19. The part 21 is axially threaded at 25 to engage the right-handed threaded termination 26 of the spindle 27 which may, for example, be the output of an electric motor (not shown). A shoulder 31 on the spindle allows the part 21 to be secured reliably thereto. However, if the spindle is capable of being driven counterclockwise, as in extracting threaded fasteners from an assembly, the part 21 will tend to unscrew from the spindle. To avoid this obviously undesirable occurrence the termination 26 is axially tapped left hand at 33 to receive a hexagon head cap screw 34 passed through a clearance hole 36. Thus the screw 34, when tightened and driven counterclockwise through the spindle 26 will, by virtue of its left-hand thread, be urged more tightly into the tapped hole 33 thereby locking the part 21 more firmly to the spindle. As additional assurance against loosening of the screw 34 a washer 41 (FIGS. 5 and 6) is positioned under the head 42 thereof. An ear 44 of the washer 41 is received in a recess 46 cut into the stem 19, and one or more additional ears 47—47 are bent outwardly over the flats of the head 42. By virtue of this expedient and the opposing left- and right-handed threads the screw 34 is enabled to resist any forces which may tend to unscrew the same.

Figure 4:
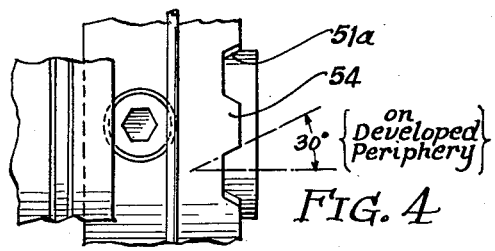
FIG. 4 is a detail showing the arrangement for preventing loss of the screw locking the device in drilling position.

Each of the parts 15 and 21 is provided with an annular array of interengageable teeth 54 preferably of trapezodial form when regarded in a radial aspect. The sloping sides 51a of the teeth enable the same to mesh with minimum chatter, to disengage rapidly without exhibiting any tendency to stick and to be only partially and yieldably engaged for percussive action whereby to "bottom" or drive home a fastening element. A preferred angle for the torque-transmitting, sloping faces 51a is 30° measured at the developed outer periphery of the teeth. FIG. 4 indicates this feature.

Resilient means are provided to maintain the clutch normally disengaged e.g. a dished, spring washer 55 received over the stem 19. A so-called Belleville washer, wave washer, compression spring or analogous device may be substituted.

From the foregoing it will have become apparent that with a driving tool clamped in the jaws 11 bearing on the fastener, e.g. a screwdriver bit and a screw, and the motor running, the spindle 27 is urged forwardly against the bias of the spring 55 to engage the clutch and to run in the fastener which, upon arriving home, will exert a reverse torque tending to disengage the clutch. Such back-driving will be sensed by the operator who will relax axial pressure and permit the clutch to disengage as aided by the spring 55.

In order to retain the two clutch parts in slidable relation with reliable, accessible and easily disassembled means a recess or groove 61 is provided peripherally of the stem 19 and engaged therein is one or more pins 62, in this case two, slidably received in bores 63. Thus, assuming that these pins have been withdrawn to clear the recess 61 the clutch part 21 may be separated to expose the several adjacent parts for servicing. In order to retain the pins 62 in operative position a hoop 65 of music wire or similar spring stock is arranged in a circumferential groove 66, and has its ends 67 bent inwardly for reception in a bore 68. Accordingly, by springing the ends 67 out of the bore 68 the hoop may be removed and the pins 62 partially or entirely withdrawn.

The arrangement just described has the paramount advantages of being safe and simple to assemble and disassemble as compared say, to screws threadedly engaged in the clutch part 15 and provided with a pilot entering the recess 61. Having in mind that the assembly shown in FIG. 1 undergoes substantial vibration during use, not only during ordinary rotation but especially during percussive action exerted by the clutch teeth, a screw may be very easily shaken loose. Even the use of a lockwasher has been found to contribute little under these vibratory conditions. It will be apparent that the loss of a retaining screw of this character can result not only in damage to the work and breakage of the drill or driver but, much more importantly, in serious hazard to the operator.

As stated heretofore the clutch is engaged for normal drilling operations. To this end and with power "off," the clutch is engaged in the manner previously described and, while there held, a dog point set screw 71 threadedly engaged in a hole 72, is positioned with its point in the recess 61 and tightened. Thus, the bias of the spring 55 is ineffective to disengage the clutch since the left side wall of the recess 61 will abut the screw point 71 and the end of the screw is bearing on the floor of the recess. Inasmuch as the torque from the prime mover to the work is carried through the clutch teeth the screw 71 is not subjected to any stress other than the moderate axial force exerted by the spring 55.

When loosened to permit the clutch to disengage the screw 71 has a tendency, under vibration and centrifugal force, to unscrew itself further. To insure against loss thereof we not only arrange (FIG. 4) that the hoop 65 bridges the tapped hole 72 but also that the chuck operating collar 12 functions similarly. Obviously, care should be taken not to obstruct the socket in the set screw.

As a subsidiary point it may be noted that the T-shaped key provided for operating the chuck collar 12 may have one end of its handle conformed to fit the socket of the set screw, e.g. hexagon, whereby the operator has the convenience of both tools in one.

While we have shown a particular embodiment of our invention, it will be understood of course, that we do not wish to be limited thereto since many modifications may be made and we, therefore, contemplated by the appended claims to cover any such modifications as fall within the true spirit and scope of our invention.

We claim:

1. Clutch mechanism to be interposed between the output spindle of a source of rotary power and means for holding a rotatable tool comprising: a driven clutch part adapted to be secured to said tool-holding means, a driving clutch part adapted to be secured to said spindle, said parts having interengageable respective clutching faces, means interposed between said parts normally to bias said parts to disengaged position, said driven part having an axial bore, said driving part having a stem received in said bore with an axial sliding fit whereby said parts may be engaged and disengaged selectively against the force of said bias means, said stem having a peripheral groove and said driven part having a bore receiving a pin engaging said groove to retain said parts in operative relation, said groove having an axial length sufficiently greater than the axially-measured groove-engaging portion of the pin to provide for axial, relative sliding engagement of the stem and bore during engagement and disengagement of the clutching faces, said pin being arranged for removal from the exterior of the driven part to effect disengagement of the driving and driven parts, and means removably retaining said pins in groove-engaging position.

2. The combination in accordance with claim 1 further characterized by means to lock said parts in driving relation.

3. The combination in accordance with claim 1 wherein said removably retaining means is a resilient hoop circumjacent said driven part and overlying the outer end of said pin.

4. The combination in accordance with claim 1 wherein said locking means is a set screw having an inner end entering said groove, and means forming part of said tool holding means overlying at least a portion of the outer end of said screw to prevent back-out and loss of said screw.

5. The combination in accordance with claim 1 wherein said clutching faces are each constituted as an annular array of teeth.

6. The combination in accordance with claim 5 wherein said teeth have torque-transmitting faces which are disposed at an angle on on the order of 60° with respect to a plane normal to the rotational axis.

7. Clutch mechanism to be interposed between the output spindle of a source of rotary power and a chuck including a body, jaws movable relatively thereto to grip a tool and a collar to open and close said jaws comprising: a first clutch member forming a rearward extension of the body having an axial bore open to the rear, a second clutch member secured to the spindle having an axial stem slidably received in said bore, said members having interengageable respective toothed faces which, when engaged, transmit torque from the second member to the first member, resilient means interposed between said members normally biasing said members to disengaged position, means common to said members maintaining the same in axially shiftable relation and means for selectively locking said members in driving relation.

8. The combination in accordance with claim 7 wherein said common maintaining means comprises a groove peripherally of said stem and a radially slidable pin mounted in said rearward extension engaging said groove, and means maintaining said pin in groove-engaging position.

9. The combination in accordance with claim 8 wherein said pin-maintaining means is a resilient hoop circumjacent said rearward extension overlying the outer end of said pin.

10. The combination in accordance with claim 7 wherein said toothed faces each comprise an annular array of teeth having torque-transmitting faces at an angle of substantially 60° to a diametrical plane through the rotational axis.

11. The combination in accordance with claim 7 further characterized in that said selective locking means comprises a peripheral groove in said stem and a screw in said body engageable in said groove, and said collar partially overlies said screw to limit outward movement thereof.

12. The combination in accordance with claim 7 further characterized in that the selective locking means comprises a peripheral groove in said stem and a screw in said body engageable in said groove, said common means comprises a pin engageable in said groove, and by the provision of a resilient hoop circumjacent said rearward extension overlying the outer end of each of the screw and pin.

References Cited by the Examiner

UNITED STATES PATENTS

| | | | |
|---|---|---|---|
| 2,484,364 | 10/49 | Whitledge | 144—32 |
| 2,611,283 | 9/52 | Askren et al. | 192—67 |
| 2,790,471 | 4/57 | Graybill | 144—32 |
| 2,857,997 | 10/58 | Graybill | 192—34 |

DAVID J. WILLIAMOWSKY, *Primary Examiner.*